Nov. 30, 1948.  W. N. WHEELER  2,455,104
EYE OPENING AND CLOSING MECHANISM FOR DOLLS
Filed April 21, 1944  3 Sheets-Sheet 1
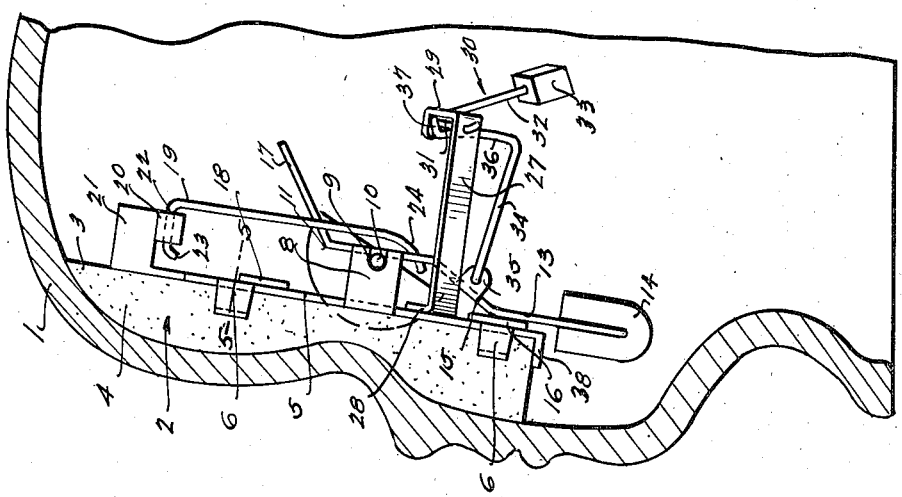
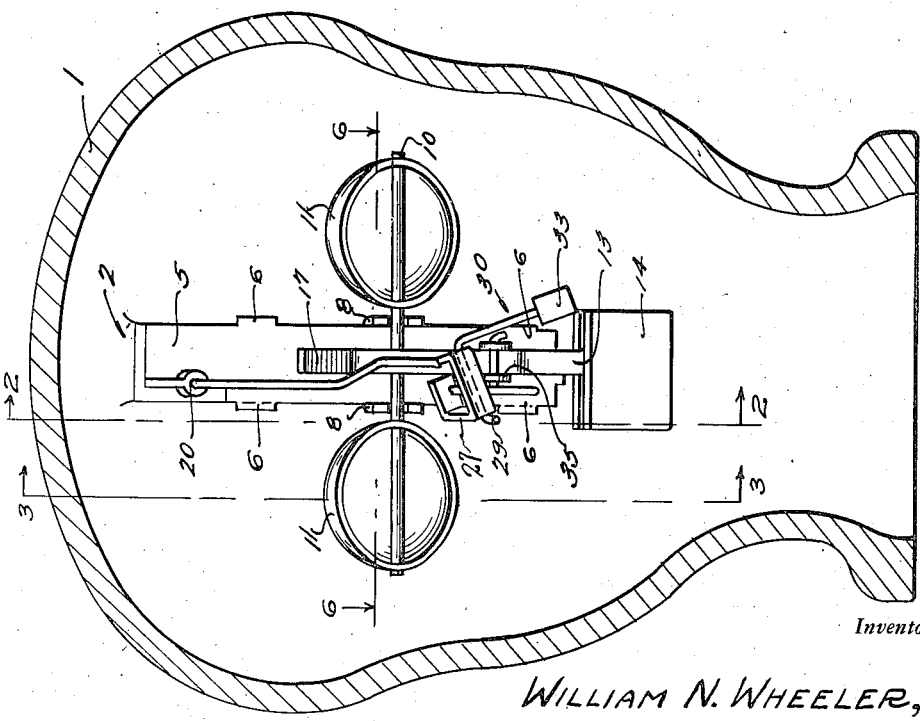
Inventor
WILLIAM N. WHEELER,
By *Clarence A. O'Brien and Harvey B. Jacobson*
Attorneys

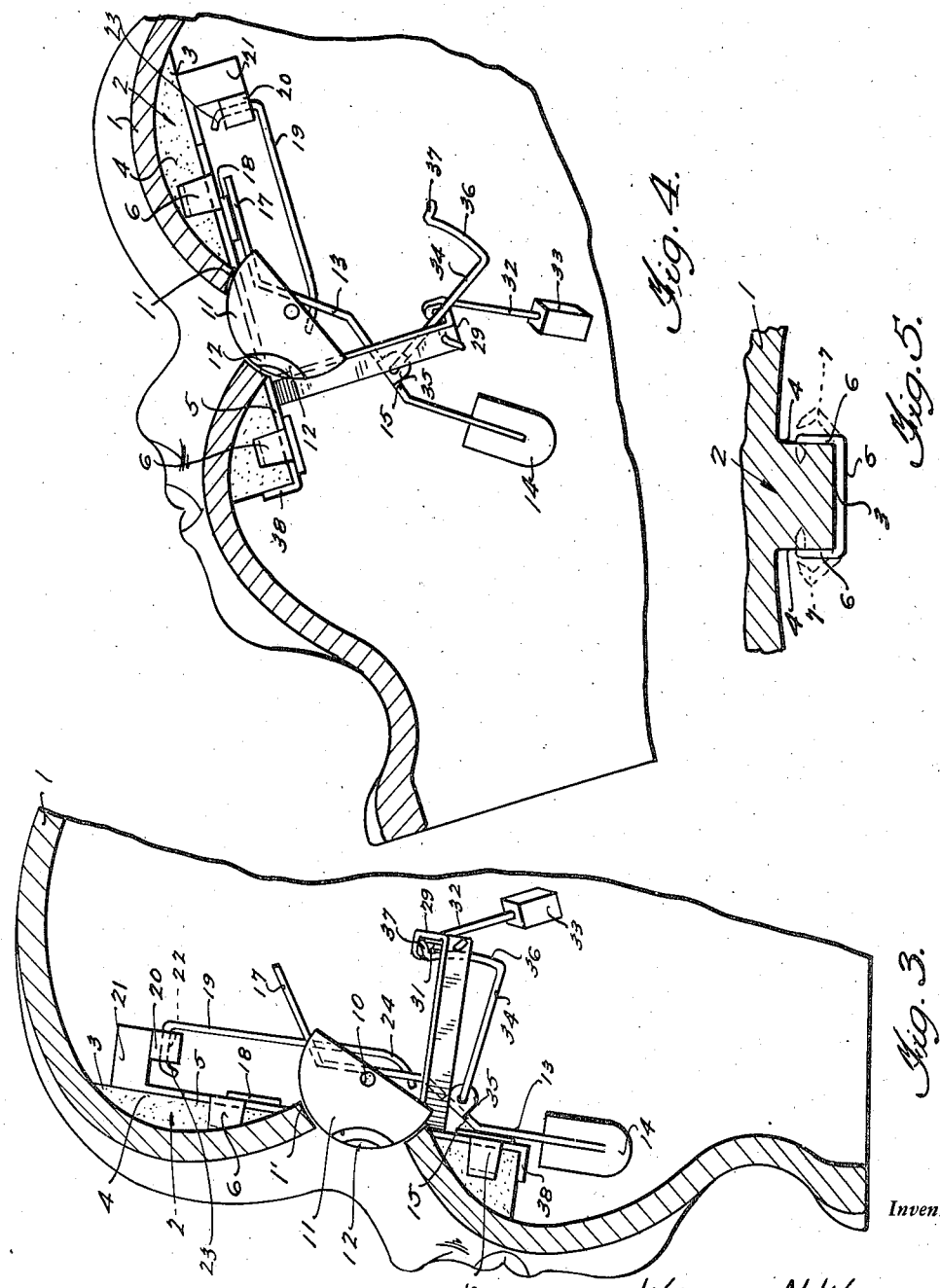

Nov. 30, 1948.　　　　W. N. WHEELER　　　　2,455,104
EYE OPENING AND CLOSING MECHANISM FOR DOLLS
Filed April 21, 1944　　　　　　　　　　　　3 Sheets-Sheet 3

Inventor
WILLIAM N. WHEELER,
By
Clarence A. O'Brien
and Harvey B. Jacobson
Attorneys Patented Nov. 30, 1948

2,455,104

UNITED STATES PATENT OFFICE 2,455,104

EYE OPENING AND CLOSING MECHANISM FOR DOLLS

William N. Wheeler, Paris, Ky.

Application April 21, 1944, Serial No. 532,076

3 Claims. (Cl. 46—169)

1

My invention relates to improvements in eye opening and closing mchanism for dolls and of the general type exemplified in my U. S. Letters Patent No. 2,303,246, over which the instant invention is designed as an improvement.

Among the important objects of my invention is to provide a simplified mechanism for effecting delayed closing of the eyes under rocking movement of the doll either endwise or sidewise when held in recumbent position, together with means for easily incorporating the mechanism in the doll's head with absolute accuracy so that the eyes will properly register with the eye sockets, all without increasing the manufacturing costs.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in vertical section through a doll's head illustrating my improved mechanism incorporated therein with the parts showing in rear elevation.

Figure 6:
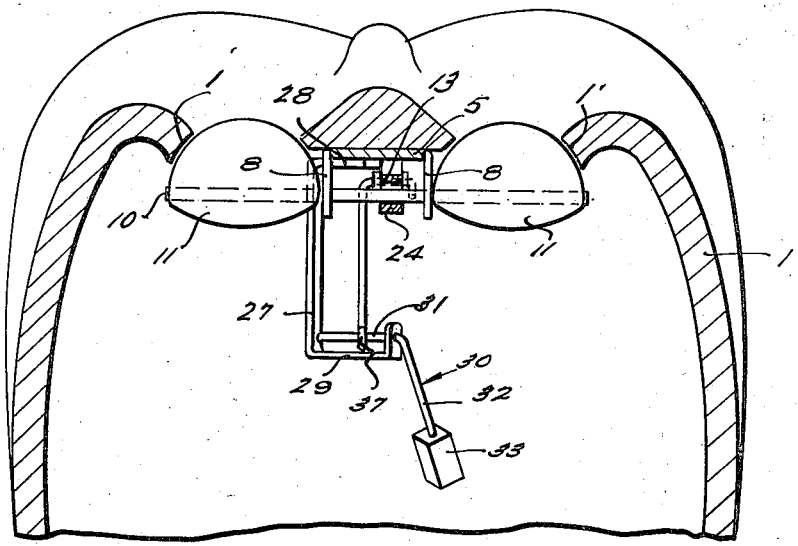
Figure 7:
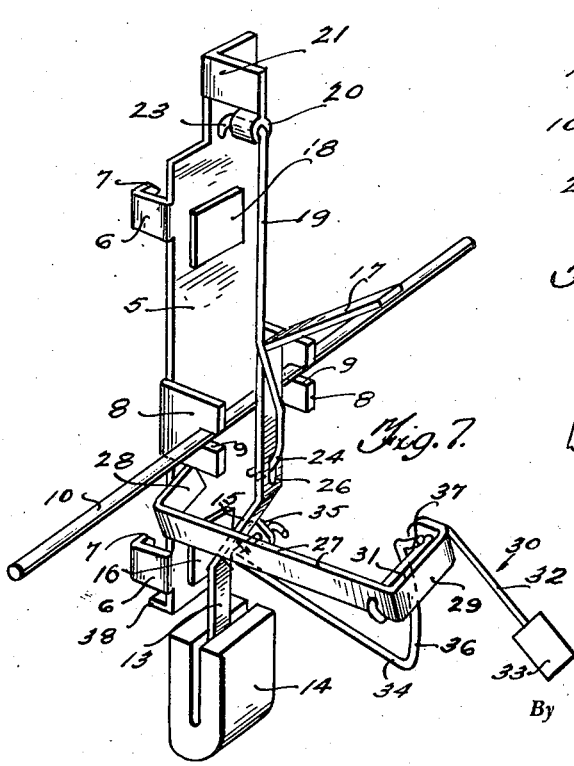
Figures 8, 9:
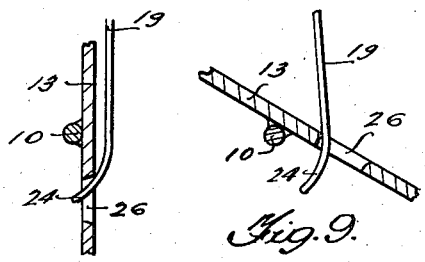

Figure 2 is a view in vertical section taken on the line 2—2 of Figure 1 with the parts of the mechanism shown in the position in which the eyes are open, Figure 3 is a similar view taken on the line 3—3 of Figure 1, Figure 4 is a view similar to Figure 3 with the doll's head shown in recumbent position and the parts of the mechanism shown in the position in which the eyes are closed, Figure 5 is a detail view in transverse section taken on the line 5—5 of Figure 2 and drawn to an enlarged scale, Figure 6 is a view in horizontal section taken on the line 6—6 of Figure 1, Figure 7 is a view in perspective of the eye opening and closing mechanism detached and drawn to an enlarged scale, Figure 8 is a fragmentary view in vertical section showing the shaft operating bar and the bar tensioning spring in the relative positions occupied by the same when the eyes are open, Figure 9 is a similar view showing the shaft operating bar and spring in the positions they assume when the eyes are closed.

Figure 10:
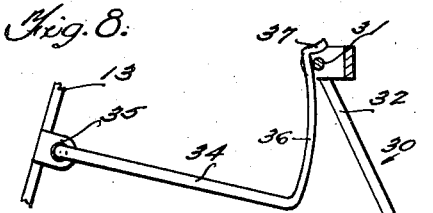

Figure 10 is a detail view in side elevation, with parts in section, illustrating the positions of the locking rod and release rod when the eyes are open.

2

Referring to the drawings by numerals, according to my invention, the doll's head 1 is suitably provided with an internal rib 2 perpendicular to the longitudinal axis of the eye sockets 1' and centered midway between said sockets, said rib being of rectangular form in cross section to provide a flat rear face 3 and straight sides 4 thereon for a purpose presently apparent. The rib 2 extends from substantially the forehead region of the doll head 1 to the mouth region, as shown in the drawings.

My improved eye opening and closing mechanism comprises as the primary element thereof a flat base bar 5 of the same width as the rib 2 and which is imposed flat against the rear face 3 of said rib and extends longitudinally along said face from the lower end of the rib 2 to within a short distance of the upper end of the rib. The base bar 5 is formed of any suitable metal and provided with upper and lower pairs of opposed side edge lugs 6 bent flat against the sides 4 of the rib 2 and having inturned sharp right angled ends 7 driven into the sides 4 of said rib 2. Intermediate the eye sockets 1', the base bar 5 is provided with a pair of opposed rearwardly extending edge ears 8 provided with horizontally aligned rear edge notches, as at 9, forming bearings for an eye-operating rock shaft 10 fitted in said notches and having suitably fixed on the ends thereof the usual eyeball members 11, with the pupils 12 arranged thereon so that in the normal position of the rock shaft 10 said members are in normal position with the eyes open.

A shaft-operating bar 13 is suitably secured, as by spot welding, not shown, to the shaft 10 intermediate its ends in the transverse center of the shaft to extend upon opposite sides of the shaft in upright position in the normal position of said shaft 10. The lower end of the bar 13 normally depends below the lower end of the base bar 5 and is equipped with a suitable weight 14 whereby, when the doll is inclined into recumbent position, the lower end of the bar 13 is swung downwardly under the influence of gravity to rock the shaft 10 and eyeball members 11 so that the eyes are closed. As shown, the bar 13 intermediate the rock shaft 10 and the weight 14 is bent, as at 15, so that in the normal position of the rock shaft 10 in which the eyes are open, said weight is disposed well forwardly of said shaft. This feature obviates loss of leverage exerted by the bar 13 as said bar swings into the position in which the eyes are closed by preventing the weight and bar from assuming substantially perpendicular position relative to the axis of the rock shaft 10 when the doll is tilted into recumbent position. A suitable cushion stop 16 is provided on the lower end of the base bar 5 for engagement by the bar 13 to establish the normal position of said bar in which the eyes are open, the rock shaft and eyeball members 11. The bar 13 is provided above the rock shaft 10 with a rearwardly inclined stop terminal 17 adapted to engage a cushion stop 18 on the base bar 5 and establish the position of said bar 13 in which the eyes are closed, rock shaft 10 and eyeball members 11.

A spring 19 of rod-like form is attached at its upper end to a barrel-like keeper 20 carried by a rearwardly extending flange 21 on the upper end of the base bar 5, said spring having an upper right angled end 22 inserted through said keeper and bent, as at 23, to retain the same in the keeper, and a lower forwardly curved end 24 slidably inserted forwardly through a slot 26 provided in the bar 13 below the rock shaft 10. The curved end 24 of the spring 19 slidably engages the upper edge of the slot 26 and thereby yieldingly retains the bar 13 in the position in which the eyes are open. As will presently appear, the spring 19 also tends to hold the bar 13 in eye closing position.

Extending rearwardly from the base bar 5, at a right angle thereto, is a bar-like bracket arm 27 having a right angled front end 28 suitably secured to said base bar 5, as by welding, not shown, and a rear right angled end 29. A right angled release rod 30 is provided at the end 29 of the bracket arm 27, said rod comprising a journaled end 31 and an oscillating pendent end 32 equipped with a terminal weight 33. The end 31 of the rod 30 extends crosswise of the head 1 and inclines from the horizontal, and the axis of the rock shaft 10, so that the end 32 of the rod 30 in the recumbent position of the doll head 1 will tend to assume under the action of gravity a position oblique to the longitudinal axis of the head 1 of the doll.

A hook-shaped locking rod 34 is pivoted at one end, to an edge lug 35 on the bar 13 for oscillation about an axis parallel with the axis of the rock shaft 10 and is provided with an arcuate end 36 eccentric to the axis of the rod 34 and terminating in an angular lip 37, the arrangement being such that in the normal position of the bar 13 in which the eyes are open, the lip 37 overhangs the end 31 of the release rod 30 and the arcuate end 36 of said rod 34 bears against said end 31.

To accurately position the described eye opening and closing mechanism on the rib 2 lengthwise of said rib, the base bar 5 is provided with a lower end right angled lug 38 adapted to bear against the lower end of said rib.

The operation of the described mechanism will be readily understood from the following. Because of the described arrangement of the release rod 30, said rod, in the recumbent position of the doll's head, may be oscillated either by endwise rocking of the doll or rocking of the doll sidewise. Under such rocking of the rod 30, the end 31 thereof gradually feeds the end 36 of the locking rod 34, by frictional engagement therewith, past said end 31 of the rod 30 and thereby releases the bar 13 so that the latter may swing under the influence of gravity and the weight 14 into eye closing position shown in Figure 4. The arcuate end 36 of the locking rod 34 is, as will be seen, slightly eccentric to the pivot of said rod, the terminal with the angular lip 37 thereon being further from the axis of oscillation of said locking rod 34 than the remainder of said arcuate end 36. Hence, when the release rod 30 is rocked clockwise, as viewed in Figures 2, 3, and 4, its end 31 constantly feeds the arcuate end 36 of the locking rod 34, whereas, when said release rod 30 is rocked counter-clockwise, as viewed in Figures 2, 3 and 4, a certain amount of slippage occurs between the arcuate end 36 of the locking rod 34 and said end 31 of the release rod 30. Thus the arcuate end 36 of said locking rod 34 will be caused to feed in one direction past the end 31 of the release rod 30 by rocking the release rod 30 in opposite directions. In the described position of the bar 13 in which the eyes are closed, the end 24 of the spring 19 frictionally engages the upper edge of the slot 26 in said bar and tends to yieldingly retain the bar 13 in said position. As soon as the doll is moved to upright position, the locking rod 34 swings, under the influence of gravity, back into its described normal position with the lip 37 overhanging the end 31 of the release rod 30, the weight 14 overcomes the tendency of the end 24 of the spring 19 to retain the bar 13 in the position in which the eyes are closed and as soon as such tendency is overcome, returns the bar 13 and rock shaft 10 to normal position, the spring 19 bearing against the upper edge of the slot 26 and retaining said bar 13 in said normal position. In connection with the spring 19, it is to be noted that said spring, in addition to the functions previously described as performed thereby, serves to hold the rock shaft 10 in the notches 9, retards swinging of the bar 13 and rocking of said shaft 10 into eye closing position when said bar is released and returns the bar 13 to the position in which the eyes are open with the weight 14 disposed forwardly of the axis of the rock shaft 10, when the doll is tilted into upright position substantially.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a doll having a head provided with eye sockets therein, an internal rib in said head extending perpendicularly of the axis of the eye sockets intermediate the same, eye opening and closing mechanism fastened to said rib and including a pair of eyeball members, a rock shaft having said members fixed on the opposite ends thereof and adapted for rocking in opposite directions into eye opening and closing positions, respectively, a weighted arm on said shaft operative in opposite directions under the influence of gravity to rock said shaft into eye opening position when the doll is moved into upright position and to rock said shaft into eye closing position when the doll is moved into recumbent position, and means to releasably restrain said arm against movement in one direction when the doll is in upright position and operative by rocking of the doll endwise and sidewise, respectively, when the doll is in recumbent position to gradually release said arm.

2. In a doll having a head provided with eye sockets therein, an internal rib in said head extending perpendicularly of the axis of the eye sockets intermediate the same, eye opening and closing mechanism fastened to said rib and including a pair of eyeball members, a rock shaft having said members fixed on the opposite ends thereof and adapted for rocking in opposite directions into eye opening and closing positions, respectively, a weighted arm on said shaft operative in opposite directions under the influence of gravity to rock said shaft into eye opening position when the doll is moved into upright position and to rock said shaft into eye closing position when the doll is moved into recumbent position, and means to releasably restrain said arm against movement in one direction when the doll is in upright position operative by rocking of the doll endwise and sidewise, respectively, when said doll is in recumbent position to gradually release said arm, said means comprising a right angled rod having a weighted end, means to mount the other end of said rod in said head for oscillating movement about an axis oblique to the longitudinal and transverse axes of the head, and a locking member released by such oscillation of said other end of the rod.

3. In a doll having a head provided with eye sockets therein, eye opening and closing mechanism fastened in said head and including a pair of eyeball members, a rock shaft having said members fixed on the opposite ends thereof and adapted for rocking in opposite directions into eye opening and closing positions, respectively, a weighted arm on said shaft operative in opposite directions under the influence of gravity to rock said shaft into eye opening position when the doll is in upright position and to rock said shaft into eye closing position when the doll is moved into recumbent position, and means to releasably restrain said arm against movement in one direction when the doll is in upright position and operative by rocking of the doll endwise and sidewise, respectively, when said doll is in recumbent position to gradually release said arm.

WILLIAM N. WHEELER.

REFERENCES CITED

The following references are of record in the file of this patent:

UNITED STATES PATENTS

| Number | Name | Date |
|---|---|---|
| 1,621,072 | Konoff | Mar. 15, 1927 |
| 1,792,176 | Marcus | Feb. 10, 1931 |
| 1,805,085 | Grubman | May 12, 1931 |
| 1,976,370 | Popovich | Oct. 9, 1934 |
| 1,999,726 | Grubman | Apr. 30, 1935 |
| 2,202,106 | Knott | May 28, 1940 |

FOREIGN PATENTS

| Number | Country | Date |
|---|---|---|
| 731,560 | France | May 30, 1932 |